United States Patent
Yasui

(10) Patent No.: US 12,422,271 B2
(45) Date of Patent: Sep. 23, 2025

(54) INFORMATION OUTPUT DEVICE AND INFORMATION OUTPUT METHOD

(71) Applicant: MICWARE CO., LTD., Hyogo (JP)

(72) Inventor: Yurie Yasui, Hyogo (JP)

(73) Assignee: MICWARE CO., LTD., Hyogo (JP)

( * ) Notice: Subject to any disclaimer, the term of this patent is extended or adjusted under 35 U.S.C. 154(b) by 0 days.

(21) Appl. No.: 18/758,845

(22) Filed: Jun. 28, 2024

(65) Prior Publication Data

US 2024/0353233 A1    Oct. 24, 2024

Related U.S. Application Data

(63) Continuation of application No. PCT/JP2022/029774, filed on Aug. 3, 2022.

(30) Foreign Application Priority Data

Jan. 24, 2022  (JP) .................................. 2022-008751

(51) Int. Cl.
   *G01C 21/36*  (2006.01)
   *G07C 5/00*   (2006.01)

(52) U.S. Cl.
   CPC ..... *G01C 21/3697* (2013.01); *G01C 21/3691* (2013.01); *G07C 5/006* (2013.01)

(58) Field of Classification Search
   CPC . G01C 21/3697; G01C 21/3691; G07C 5/006
   (Continued)

(56) References Cited

U.S. PATENT DOCUMENTS

| 6,484,093 B1 * | 11/2002 | Ito ......................... G01C 21/34 340/990 |
| 8,825,354 B2 * | 9/2014 | Horita ................. G01C 21/3469 701/118 |

(Continued)

FOREIGN PATENT DOCUMENTS

| JP | H10-26537 A | 1/1998 |
| JP | 2004-163179 A | 6/2004 |

(Continued)

OTHER PUBLICATIONS

Decision to Grant Patent mailed Dec. 18, 2024, issue in Japanese Patent Application No. 2023-575047 (5 pages).

(Continued)

*Primary Examiner* — Luis A Martinez Borrero
(74) *Attorney, Agent, or Firm* — Nakanishi IP Associates, LLC

(57) ABSTRACT

An information output device (1) includes an output device (12) that outputs at least one of image data, text data, or voice data, and a control device (14) that causes the output device (12) to output recharging proposal information (38) when a predetermined condition is satisfied, the recharging proposal information being information that encourages recharging of a power source that drives a mobile unit (2). When predetermined conditions are satisfied, the information output device (1) outputs the recharging proposal information (38). The predetermined conditions include a condition that first and second destinations are set and a condition that the mobile unit (2) has come close to the first destination within a first predetermined distance, the second destination being a destination for which the mobile unit (2) heads after arrival at the first destination.

4 Claims, 5 Drawing Sheets

(58) Field of Classification Search
USPC .......................................................... 701/423
See application file for complete search history.

(56) References Cited

U.S. PATENT DOCUMENTS

| | | | | |
|---|---|---|---|---|
| 11,740,096 | B2* | 8/2023 | Kim | ..................... G06F 16/29 |
| | | | | 701/533 |
| 11,788,851 | B2* | 10/2023 | Kim | .................. G01C 21/3697 |
| | | | | 701/423 |
| 11,846,515 | B2* | 12/2023 | Kim | ..................... G06F 21/84 |
| 11,913,797 | B2* | 2/2024 | Maeda | ............... G01C 21/3469 |
| 11,987,144 | B2* | 5/2024 | Lu | ........................ B60L 53/305 |
| 12,202,372 | B2* | 1/2025 | Maeda | ................. G06Q 10/02 |
| 2009/0171562 | A1* | 7/2009 | Shimada | ............. G09B 29/106 |
| | | | | 701/533 |
| 2009/0191901 | A1* | 7/2009 | Behr | ..................... G08G 1/092 |
| | | | | 455/457 |
| 2010/0106401 | A1* | 4/2010 | Naito | ..................... B60L 53/00 |
| | | | | 701/533 |
| 2012/0019204 | A1 | 1/2012 | Matsuo et al. | |
| 2013/0013139 | A1* | 1/2013 | Maki | ................. G01C 21/3697 |
| | | | | 701/1 |
| 2013/0226441 | A1* | 8/2013 | Horita | ............... G01C 21/3469 |
| | | | | 701/117 |
| 2017/0074677 | A1* | 3/2017 | Macneille | .......... G01C 21/3469 |
| 2017/0176200 | A1* | 6/2017 | Jones | ................. G01C 21/3697 |
| 2021/0389142 | A1* | 12/2021 | Kim | .................... G01C 21/3691 |
| 2021/0389143 | A1* | 12/2021 | Kim | ..................... G01C 21/362 |
| 2021/0389144 | A1* | 12/2021 | Kim | .................... G01C 21/3691 |
| 2024/0219188 | A1* | 7/2024 | Kim | .................... G01C 21/3682 |
| 2024/0401969 | A1* | 12/2024 | Yasui | ................. G01C 21/3682 |
| 2024/0416788 | A1* | 12/2024 | Kita | ....................... G06Q 50/40 |

FOREIGN PATENT DOCUMENTS

| | | |
|---|---|---|
| JP | 2012-26813 A | 2/2012 |
| JP | 2017-133954 A | 8/2017 |
| JP | 2019-87037 A | 6/2019 |
| JP | 2021-148472 A | 9/2021 |

OTHER PUBLICATIONS

International Search Report issued in PCT/JP2022/029774 mailed on Sep. 20, 2022 with English Translation (6 pages).
Written Opinion of International Searching Authority mailed on PCT/JP2022/029774 mailed on Sep. 20, 2022 with English Translation (7 pages).

* cited by examiner

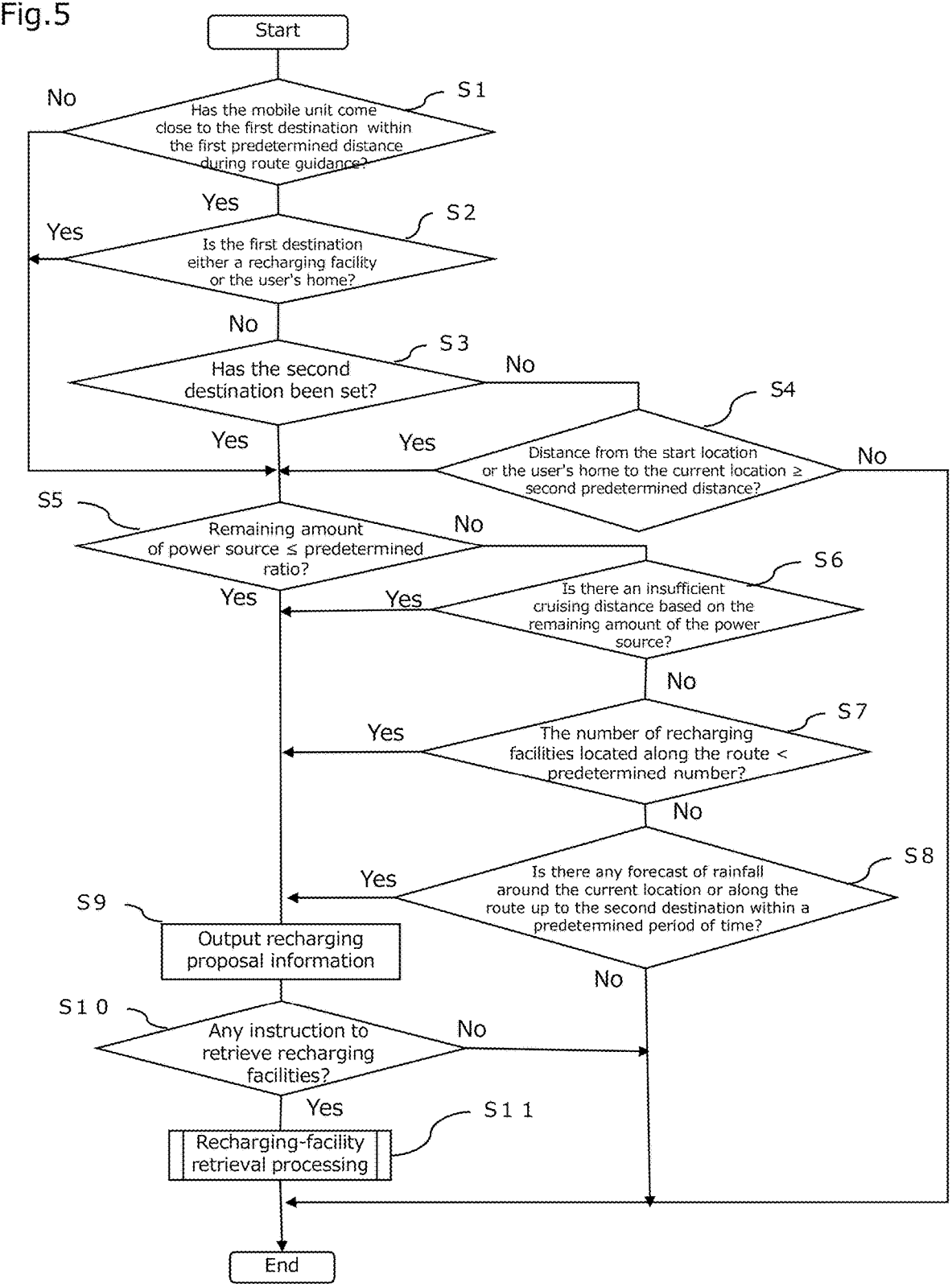

INFORMATION OUTPUT DEVICE AND INFORMATION OUTPUT METHOD

CROSS-REFERENCE TO RELATED APPLICATIONS

This application is a continuation application of International Patent Application No. PCT/JP2022/029774 filed on Aug. 3, 2022, which claims priority to Japanese Patent Application No. 2022-008751 filed on Jan. 24, 2022, the entire contents of which are incorporated by reference.

TECHNICAL FIELD

The present invention relates to an information output device that outputs information for encouraging recharging of a power source that drives a mobile unit and to an information output control method of causing the information output device to output the aforementioned information.

BACKGROUND ART

Patent Literature (PTL) 1 discloses a charging facility guide device that calculates a path for the purpose of charging on the basis of vehicle notification information. The vehicle notification information includes information that indicates identification information, position data on a motor vehicle, and the state of charge of the motor vehicle; and information that indicates a round-trip path on which the motor vehicle travels between a predetermined start location and a predetermined destination. According to PTL 1, the charging facility guide device is capable of guiding the motor vehicle to a charging facility when there is an appropriate amount of charge remaining in the power source, the charging facility being located on the way or in the vicinity of the path on which the motor vehicle reciprocates repeatedly at regular time intervals.

CITATION LIST

Patent Literature

[PTL 1]
Japanese Unexamined Patent Application Publication No. 2021-148472

SUMMARY OF INVENTION

Technical Problem

However, the charging facility guide device disclosed in PTL 1 may not allow a smooth transition to the next activity because there is a possibility that charging is required immediately after departure for the next destination.

It is an object of the present invention to provide an information output device and an information output control method that achieve a smooth transition to the next activity.

Solution to Problem

An information output device according to one aspect of the present disclosure includes an output device and a control device. The output device outputs at least one of image data, text data, or voice data. The control device causes the output device to output recharging proposal information when a predetermined condition is satisfied. The recharging proposal information is information that encourages recharging of a power source that drives a mobile unit. The predetermine condition includes a condition that a first destination and a second destination are set as destinations of the mobile unit. The second destination is a destination for which the mobile unit heads after arrival at the first destination. The predetermined condition also includes a condition that the mobile unit has come close to the first destination within a predetermined distance.

The information output device according to the one aspect is capable of outputting the recharging proposal information to the output device with appropriate timing when the mobile unit can smoothly depart for the second destination from the first destination.

In the information output device according to the one aspect of the present disclosure, the predetermined condition further includes a condition that the first destination is not a recharging facility. The recharging facility is a facility where the mobile unit is capable of recharging the power source. The control device acquires destination information. The destination information is information on the destinations that have been set. When the first destination is the recharging facility, the control device does not output the recharging proposal information.

The information output device according to the one aspect is capable of preventing the recharging proposal information from being output when there is no need to recharge the power source.

In the information output device according to the one aspect of the present disclosure, the predetermined condition further includes a condition that a cruising distance is shorter than a route distance or that a difference between the cruising distance and the route distance is less than or equal to the predetermined distance. The cruising distance is a distance over which the mobile unit is assumed to be capable of continuing to travel with a remaining amount of the power source. The route distance is a distance from a current location of the mobile unit to the second destination. When the mobile unit has come close to the first destination within the predetermined distance, the control device acquires charge remaining data to calculate the cruising distance. The charge remaining data indicates the remaining amount of the power source. When the mobile unit has come close to the first destination within the predetermined distance, the control device acquires position data to calculate the route distance. The position data indicates the current location of the mobile unit. When the cruising distance is longer than the route distance and the difference between the cruising distance and the route distance exceeds the predetermined distance, the control device does not output the recharging proposal information.

The information output device according to the one aspect is capable of reducing the possibility that the recharging proposal information will be output when there is no need to recharge the power source.

In the information output device according to the one aspect of the present disclosure, the predetermined condition further includes a condition that a total number of recharging facilities is less than a predetermined number. The recharging facilities are each a recharging facility and located along a route from the first destination to the second destination. When the mobile unit has come close to the first destination within the predetermined distance, the control device acquires recharging facility information. The recharging facility information is information on the recharging facilities located along the route from the first destination to the second destination. When the total number of the recharging facilities is greater than the predetermined number, the control device does not output the recharging proposal information.

The information output device according to the one aspect is capable of reducing the possibility that the recharging proposal information will be output when there is no need to recharge the power source.

In the information output device according to the one aspect of the present disclosure, the predetermined condition further includes a condition that there is a forecast of inclement weather at the current location of the mobile unit or along the route ahead of the current location. When the mobile unit has come close to the first destination within the predetermined distance, the control device acquires weather information. When there is no forecast of inclement weather at the current location of the mobile unit or along the route ahead of the current location within a predetermined period of time from a present time, the control device does not output the recharging proposal information.

The information output device according to the one aspect is capable of preventing the occurrence of a situation where the recharging of the power source is required in inclement weather.

An information output method according to another aspect of the present disclosure is a method for use in a control method of causing an output device to output recharging proposal information, the output device outputting at least one of image data, text data, or voice data, the recharging proposal information being information that encourages recharging of a power source that drives a mobile unit. The information output method includes outputting the recharging proposal information when a first destination and a second destination are set as destinations of the mobile unit and the mobile unit has come close to the first destination within a predetermined distance, the second destination being a destination for which the mobile unit heads after arrival at the first destination.

Advantageous Effects of Invention

According to the present invention, whether the recharging of the power source is necessary is proposed before transition to the next activity. This allows a smooth transition to the next activity.

BRIEF DESCRIPTION OF DRAWINGS

FIG. 5
FIG. 5 is a flowchart for recharging proposal processing.

DESCRIPTION OF EMBODIMENTS

Figure 1:
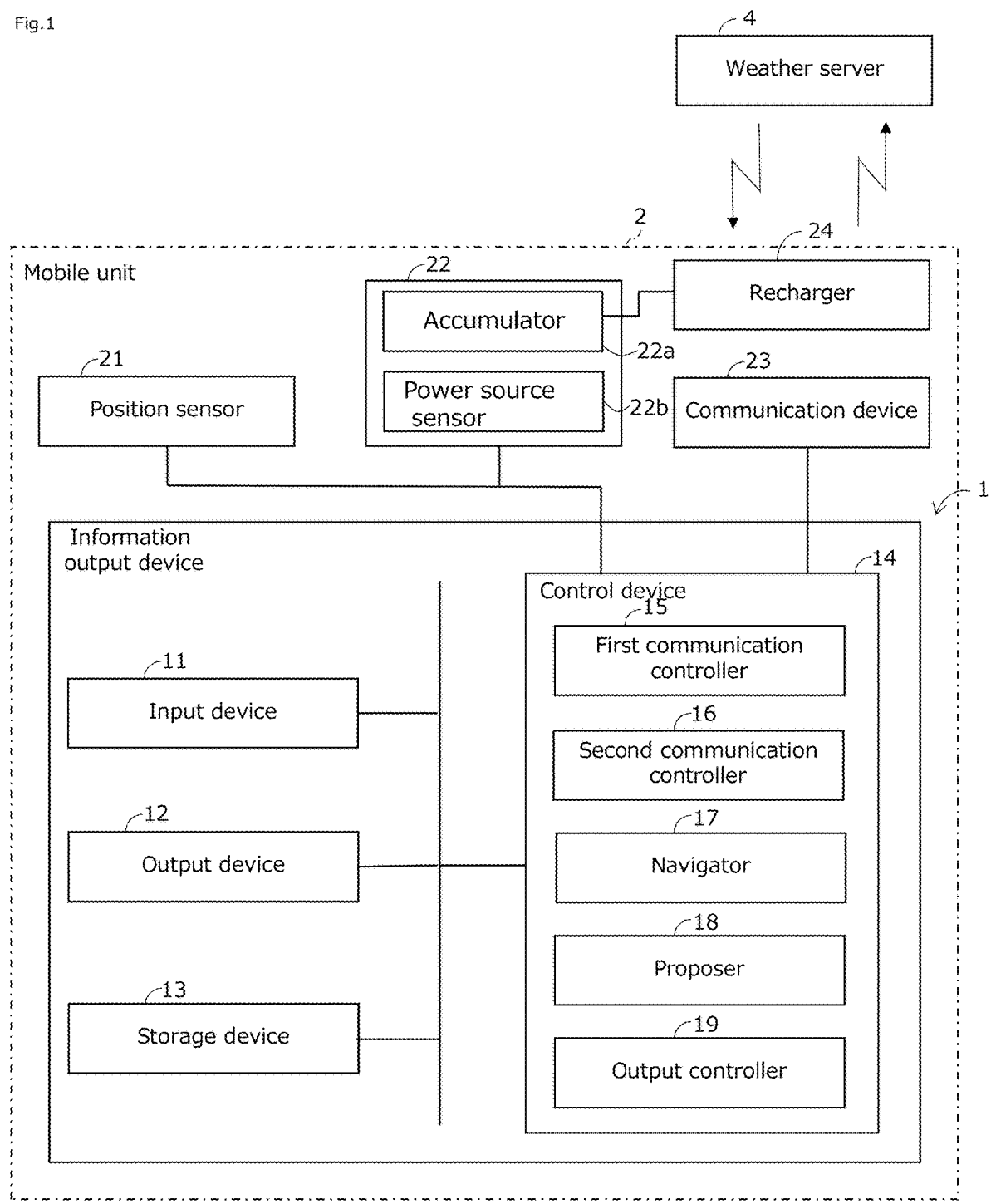
FIG. 1
FIG. 1 is a schematic configuration diagram of an information output device according to one embodiment of the present invention.

As shown in FIG. 1, an information output device 1 according to one embodiment of the present invention includes an input device 11, an output device 12, a storage device 13, and a control device 14. The control device 14 includes a first communication controller 15, a second communication controller 16, a navigator 17, a proposer 18, and an output controller 19. The information output device 1 is on board of a mobile unit 2. For example, the information output device 1 may be a car navigation system, a smartphone, a digitizing tablet, or a personal computer. In the present embodiment, the information output device 1 is a car navigation system.

The mobile unit 2 may, for example, be a vehicle such as an automobile or a two-wheel vehicle such as a motorbike. In the present embodiment, the mobile unit 2 is an electric automobile. The electric automobile is driven by electricity serving as a power source. In the present embodiment, the mobile unit 2 includes a position sensor 21, a power source unit 22, a communication device 23, and a recharger 24. Note that "being on board" means that the information output device 1 travels together with the mobile unit 2. Being on board includes installation of the information output device 1 in the mobile unit 2 and carrying in of the information output device 1 into the mobile unit 2 by a user.

Figure 2:
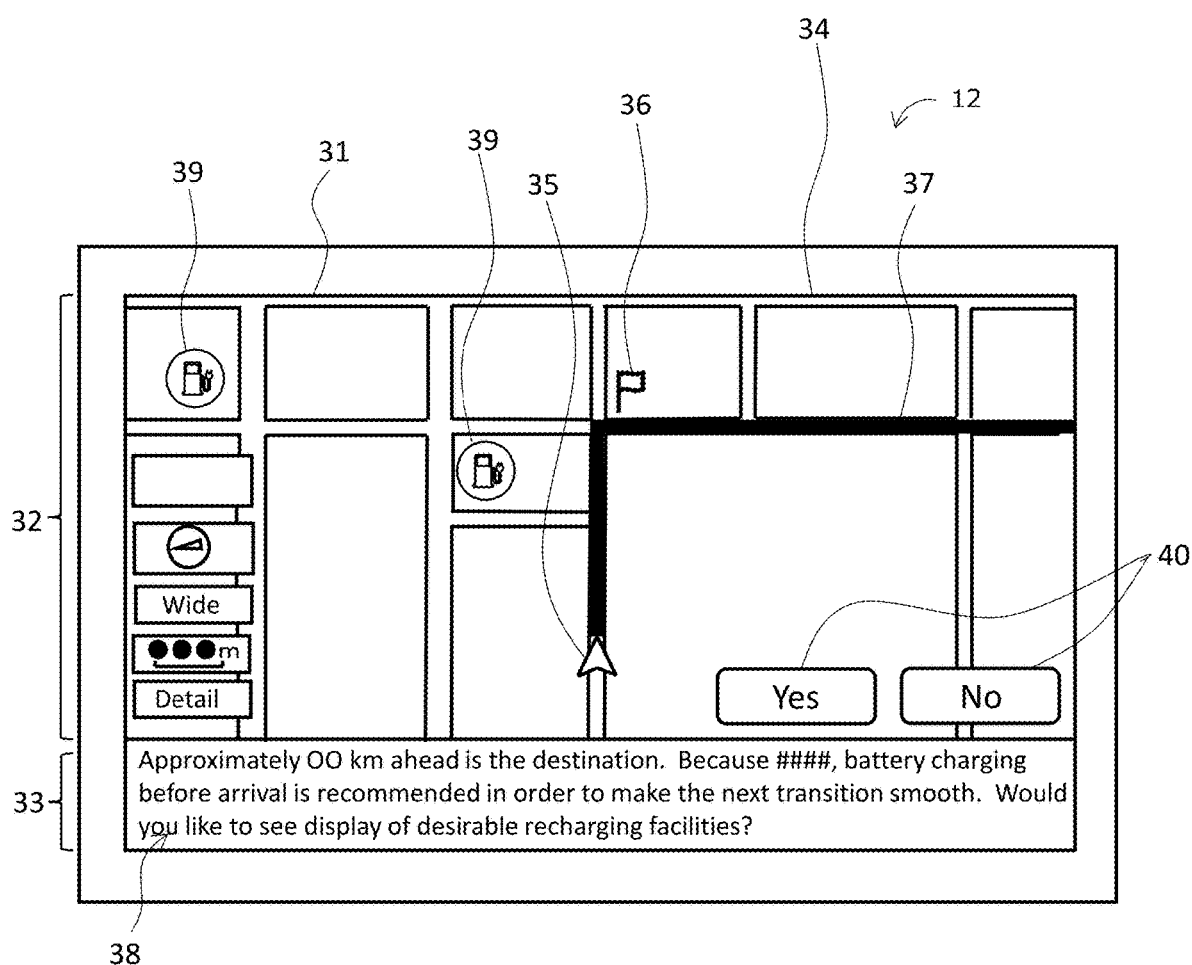
FIG. 2
FIG. 2 shows one example of recharging proposal information.

The output controller 19 causes the output device 12 to output recharging proposal information 38 as shown in FIG. 2 when a predetermined condition is satisfied. The recharging proposal information 38 is information that prompts a user to recharge the power source. The predetermined condition may include a plurality of conditions. For example, Condition 1 serving as one of the predetermined conditions is that two destinations are set as in the image shown in FIG. 3.

Figure 3:
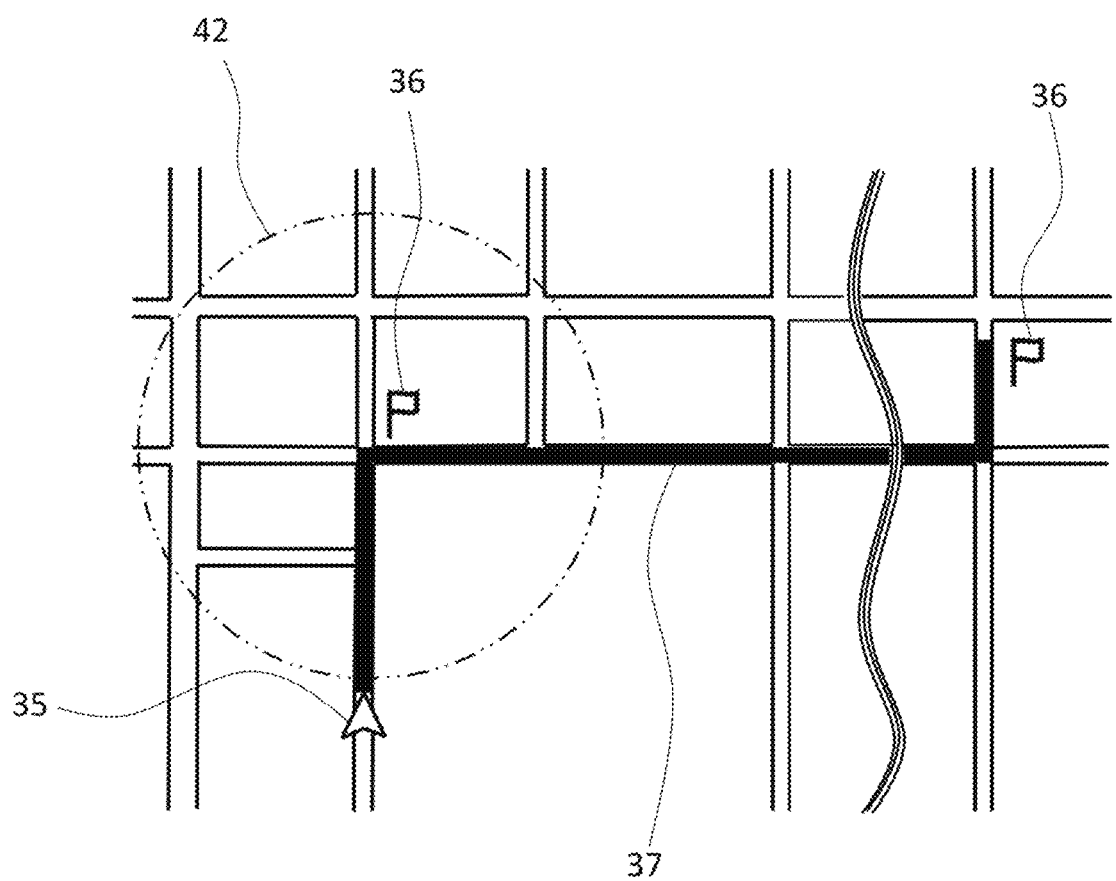
FIG. 3
FIG. 3 shows an image of a state in which two destinations are set.

Goal icons 36 correspond to the two destinations. The goal icons 36 may, for example, be flag graphics. As shown in FIG. 3, a current location mark 35 corresponds to the current location of the mobile unit 2. A route graphic 37 corresponds to a route between the current location of the mobile unit 2 and the two destinations.

Setting two destinations means that the navigator 17 is guiding the mobile unit 2 along a route to these destinations. That is, Condition 1 is that the mobile unit 2 is currently being guided to a first destination along a route while a second destination has been set that is located downstream of the first destination. The first destination refers to one of the two destinations for which the mobile unit 2 heads from a starting point. The second destination is the destination next to the first destination out of the two destinations. The second destination is the other of the two destinations that is next to the first destination and for which the mobile unit 2 heads from the first destination. The first and second destinations may be set via the input device 11 by the user, or may be set from a storage in which the first and second destinations are stored in advance.

Condition 2 may be that the mobile unit 2 has come close to the first destination within a predetermined distance. For example, the predetermined distance may be a range 42 within a predetermined radius from the first destination. When the mobile unit 2 has come close to the first destination within the predetermined distance, the proposer 18 determines that Condition 2 is satisfied. Hereinafter, the predetermined distance under Condition 2 is also referred to as the "first predetermined distance."

When the predetermined conditions including at least Conditions 1 and 2 are satisfied, the output controller 19 outputs the recharging proposal information 38 to the output device 12 as shown in FIG. 2. Thus, in the case where the two destinations are set, the information output device 1 is capable of proposing the recharging of the power source with appropriate timing when the mobile unit 2 can smoothly depart for the second destination from the first destination. That is, the output controller 19 is capable of outputting the recharging proposal information 38 to the output device 12 with the timing when the mobile unit 2 has come close to the first destination within the predetermined distance. In this way, the mobile unit 2 equipped with the information output device 1 according to the present embodiment is capable of making a smooth transition to the next activity without recharging the power source after arrival at the first destination.

Details on Constituent Elements

The position sensor 21 shown in FIG. 1 acquires position data on the mobile unit 2 at predetermined time intervals. The position data indicates the current location of the mobile unit 2 at the time of acquisition. The position sensor 21 may, for example, be a global positioning system (GPS) sensor. Upon receipt of radio waves transmitted from a plurality of GPS satellites placed in the sky, the GPS sensor calculates a distance from each GPS satellite and calculates the position data indicating the current location. For example, the position data may include latitude data and longitude data. The position sensor 21 is capable of outputting the position data to the first communication controller 15.

The power source unit 22 includes an accumulator 22a and a power source sensor 22b. The accumulator 22a receives a power source. Examples of the power source include electricity, gasoline, and hydrogen. In the case where electricity serves as the power source, a drive battery serves as the accumulator 22a. In the case where gasoline or hydrogen serves as the power source, a container capable of receiving the power source serves as the accumulator 22a.

The power source sensor 22b may include at least one of sensors including a current sensor, a voltage sensor, and a temperature sensor. The power source sensor 22b acquires data that is utilized by the control device 14 to calculate the amount of the power source remaining in the accumulator 22a. In the case where electricity serves as the power source, for example, the power source sensor 22b may detect the current value, voltage value, and temperature of the battery. The power source sensor 22b is capable of outputting the acquired data to the proposer 18 via the first communication controller 15.

The communication device 23 communicates with an external device provided outside the mobile unit 2. The external device may, for example, be a server. One example of the server is a weather server 4. The weather server 4 distributes weather information. The communication device 23 is capable of acquiring the weather information from the weather server 4. The communication device 23 may, for example, be a telematics control unit (TCU). The TCU establishes two-way communication with the external device via a mobile network.

The recharger 24 is utilized for recharging the power source in the accumulator 22a. The recharger 24 is oriented to the outside of the mobile unit 2. The recharger 24 is connected to the accumulator 22a via a cable, a tube, or any other suitable means. In the present embodiment, the recharger 24 is configured to be connectable to a charging station via a charging cable.

The charging station is capable of recharging the accumulator 22a with electricity serving as the power source. The charging station is of two or more types. The type of the charging station may differ depending on, for example, boost charge or normal charge. The type of the charging station may also differ depending on, for example, the presence or absence of a charging cable. The charging station is set up in a charging site. The charging station may be set up in the user's home. The charging site corresponds to a recharging facility. Examples of the recharging facility also include a gas station and a hydrogen refueling station.

The input device 11 may be configured as, for example, a touch panel that is configured integrally with the output device 12, a voice input device capable of inputting text data by voice, or physical tab keys. In the present embodiment, the input device 11 is a touch panel. The input device 11 is operated by the user.

The output device 12 may, for example, be a touch panel configured integrally with the input device 11, a voice output speaker, or a head-up display (HUD). In the present embodiment, the output device 12 is a touch panel. The output device 12 is capable of outputting at least one of image data, text data, or voice data.

The output device 12 outputs the recharging proposal information 38. The output device 12 outputs the recharging proposal information 38 in the form of image data, text data, or voice data. In the present embodiment, the output device 12 outputs the recharging proposal information 38 in the form of text data.

The storage device 13 may include a volatile storage device that loses its information when the power is cut, and a non-volatile storage device that retains its information even after power-off. For example, the volatile storage device may be capable of temporarily storing information that is processed by the control device 14. The volatile storage device may be utilized as, for example, random access memory (RAM). The non-volatile storage device is a storage capable of storing a variety of information processing programs and a variety of information.

The variety of information may include, for example, map data for causing the output device 12 to display a map 31. The non-volatile storage device may be utilized as, for example, read-only memory (ROM). For example, the ROM may be configured as flash memory or a hard disk drive (HDD).

The map data includes road information. Roads indicated by the road information are expressed as combinations of nodes and links. The nodes may correspond to, for example, intersections and road ends. The links correspond to positions that connect adjacent nodes. The map data includes points of interest (POI) data. The POI data is data about POIs. The POIs are specific points shown on the map 31. For example, the POI data may include position data on each POI, the name and type of each POI, and image data.

The image data may, for example, be image data of icons shown on the map 31. In the present embodiment, the POIs include recharging facilities. That is, the POI data may indicate, for example, position data on each recharging facility and the name and type of each recharging facility. The POI data on the recharging facilities is hereinafter also referred to as the "recharging facility information." Examples of the type of each recharging facility include a pole mount-type standard charger with a cable, a pole mount-type standard charger without a cable, and a quick charger.

The control device 14 is electrically connected to each of the position sensor 21, the power source unit 22, the communication device 23, the input device 11, the output device 12, and the storage device 13. The control device 14 achieves a variety of functional parts by, for example, executing a variety of programs stored in the storage device 13. For example, the control device 14 may be configured as a central processing unit (CPU) or a micro processing unit (MPU).

The first communication controller 15 acquires the position data indicating the current location of the mobile unit 2 from the position sensor 21. The first communication controller 15 acquires charge remaining data from the power source unit 22, the charge remaining data indicating the remaining amount of the power source. For example, the first communication controller 15 may acquire the position data and the charge remaining data through controller area network (CAN) communication.

In the present embodiment, the second communication controller 16 acquires the weather information from the weather server 4 via the communication device 23. In order to acquire the weather information, for example, the second communication controller 16 may transmit the position data indicating the current location of the mobile unit 2 to the weather server 4. The second communication controller 16 receives weather information for a predetermined region from the weather server 4 via the communication device 23. The predetermined region refers to a region that includes the current location of the mobile unit 2. The predetermined region is also a region that includes the set route. The predetermined region is also a region that includes the first and second destinations.

The navigator 17 provides the user with information for guiding the mobile unit 2 from the start location of the mobile unit 2 to the first destination. When the mobile unit 2 has arrived at the first destination, the navigator 17 provides the user with information for guiding the mobile unit 2 from the first destination to the second destination.

The navigator 17 has a function of setting a route in accordance with the current location of the mobile unit 2 and the first and second destinations. In order to set a route, the navigator 17 acquires the position data indicating the current location of the mobile unit 2 from the position sensor 21. The navigator 17 also acquires destination information in order to set the route.

The destination information is information indicating the first and second destinations that are set by the user via the input device 11. For example, the destination information may be stored in the aforementioned volatile storage medium. The navigator 17 guides the user along the set route by at least either one of voice and visual display. If the mobile unit 2 has veered off the route, the navigator 17 is capable of rerouting (retrieving the route once again).

The navigator 17 performs recharging-facility retrieval processing. The navigator 17 performs the recharging-facility retrieval processing when the recharging proposal information 38 is output and the user has determined to recharge the power source. For example, the recharging-facility retrieval processing may be processing for retrieving desirable recharging facilities in accordance with the first destination and the current location of the mobile unit 2. The recharging-facility retrieval processing may also, for example, be processing for retrieving recharging facilities that are located around the mobile unit 2 and that are of the type corresponding to the recharger 24.

Figure 4:
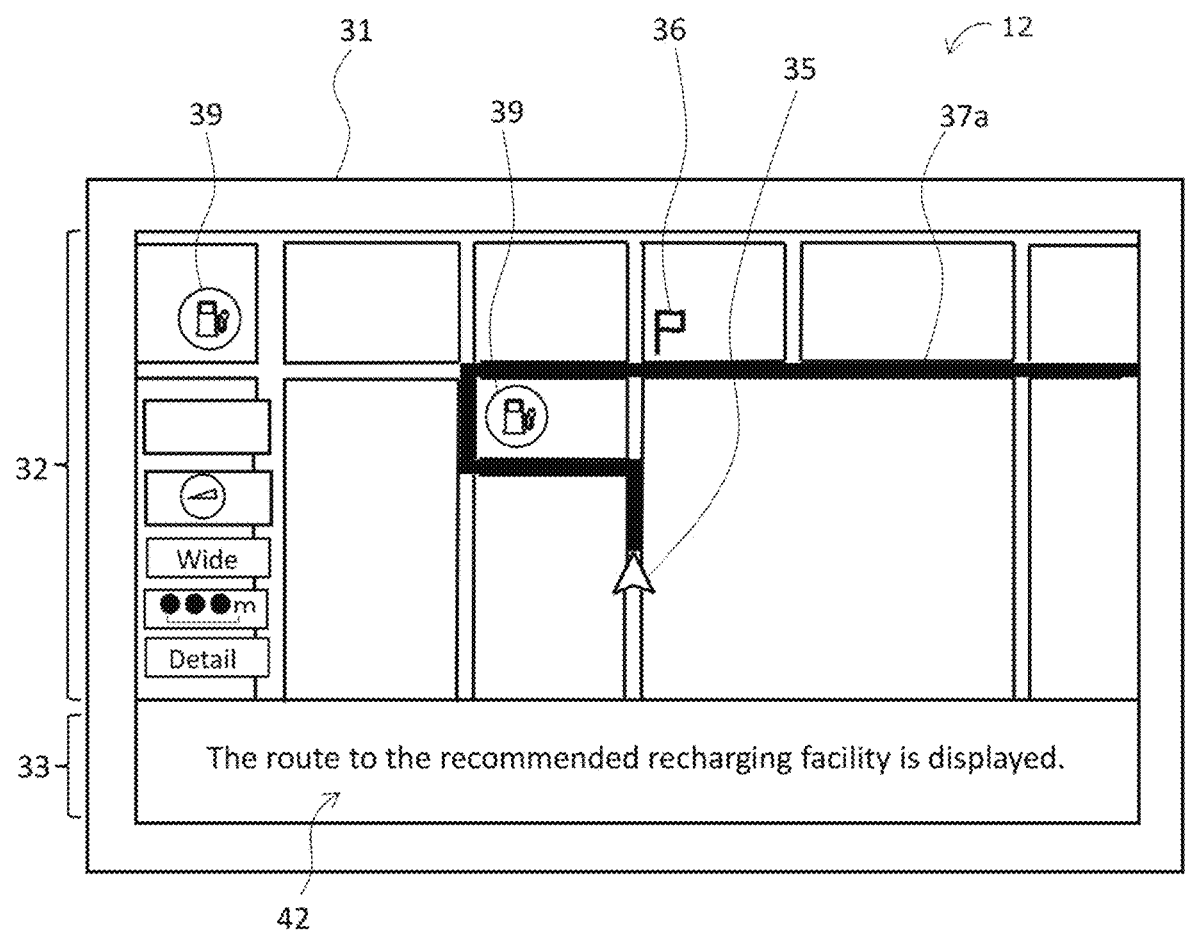
FIG. 4
FIG. 4 shows one example of a screen that shows a route to a recharging facility.

Through the recharging-facility retrieval processing, the navigator 17 obtains a route from the current location of the mobile unit 2 via the recharging facility to the first destination. The recharging-facility retrieval processing allows the navigator 17 to set a new route different from the route that has been set at the departure of the mobile unit 2. In the present embodiment, when the recharging-facility retrieval processing has been performed, the output device 12 shows the route from the current location of the mobile unit 2 via the recharging facility to the first destination by a route graphic 37a as shown in FIG. 4.

The proposer 18 performs recharging proposal processing. The recharging proposal processing is processing for outputting the recharging proposal information 38. In the present embodiment, the proposer 18 may perform the recharging proposal processing when Conditions 3 and 4 described below are further satisfied in addition to the two conditions described above.

Condition 1: the first and second destinations have been set and the mobile unit 2 is being guided along the route.

Condition 2: the mobile unit 2 has come close to the first destination within the first predetermined distance.

Condition 3: the first destination is none of the user's home, any location around the user's home, and any recharging facility.

Condition 4: the first destination is a point that is remote from the start location by a predetermined distance or more.

In order to determine whether Condition 1 is satisfied, the proposer 18 acquires the destination information. Position data on the destinations indicated by the destination information may include, for example, latitude data and longitude data. For example, when the destination information includes position data on two or more different points, the proposer 18 determines that the first and second destinations have been set.

In order to determine whether Condition 2 is satisfied, the proposer 18 acquires the position data indicating the current location of the mobile unit 2 at predetermined time intervals. The proposer 18 acquires the position data from the position sensor 21 via the first communication controller 15. The proposer 18 determines, on the basis of the position data indicating the current location of the mobile unit 2 and the position data on the first destination included in the destination information, whether the mobile unit 2 traveling along the route has come close to the first destination within the first predetermined distance. Even if the mobile unit 2 has veered off the route without following the guidance, the navigator 17 is capable of returning to a state of route guidance by rerouting.

The first predetermined distance may preferably be set by striking a balance with the overall route length from the current location of the mobile unit 2 via the first destination to the second destination. The first predetermined distance may be of such an order that it is slightly longer than a distance at which the navigator 17 does not perform rerouting even if the mobile unit 2 has come close to the first destination. The first predetermined distance may be a variable value responsive to the overall route length. For example, the first predetermined distance may preferably be greater than or equal to 0.5 km and less than or equal to 5 km.

In order to determine whether Condition 3 is satisfied, the proposer 18 determines, on the basis of the destination information, the map data, and position data on the user's home, whether the first destination is either one of the user's home and any location around the user's home. The position data on the user's home may, for example, be stored in the aforementioned non-volatile storage device. In the present embodiment, in order to determine whether Condition 3 is satisfied, the proposer 18 determines, on the basis of the recharging facility information and the first destination indicated by the destination information, whether the first destination is a recharging facility. This determination based on Condition 3 by the proposer 18 prevents the recharging proposal information 38 from being output to the output device 12 with unnecessary timing.

In order to determine whether Condition 4 is satisfied, the proposer 18 calculates a distance from the start location of the mobile unit 2 to the first destination. For example, the proposer 18 may calculate this distance on the basis of the map data, the destination information, and the position data indicating the current location of the mobile unit 2. Note that this distance may be calculated by the navigator 17. When this distance exceeds a predetermined distance, the proposer 18 determines that Condition 4 is satisfied.

The predetermined distance under Condition 4 is hereinafter also referred to as the "second predetermined distance." The second predetermined distance may preferably be greater than or equal to 50 km and less than or equal to 200 km. Here, the information output device 1 may be configured to be capable of outputting a message indicating that "the mobile unit may not be able to arrive at the destination" at the time of departure of the mobile unit 2 in accordance with the distance from the current location of the mobile unit 2 to the first destination. In this case, the second predetermined distance may be a value greater than a distance at which the aforementioned message is output. This determination based on Condition 4 by the proposer 18 prevents a proposal to recharge the power source from being offered when the mobile unit 2 consumes a low amount of the power source.

The proposer 18 may also be configured to perform the recharging proposal processing when Conditions 5 and 6 described below are further satisfied in addition to the four conditions described above.

Condition 5: the amount of the power source remaining in the mobile unit 2 is lower than or equal to a predetermined ratio.

Condition 6: when the accumulator 22a is a battery, the status of the battery is suitable for charging.

In order to determine whether Condition 5 is satisfied, the proposer 18 acquires charge remaining data from the power source sensor 22b via the first communication controller 15. The proposer 18 determines, on the basis of the charge remaining data, whether the remaining amount of the power source is lower than or equal to the predetermined ratio. The predetermined ratio is a ratio of the remaining amount of the power source to the maximum amount of the power source that can be accumulated in the accumulator 22a. For example, the predetermined ratio may be 60%. More preferably, the predetermined ratio may be 50%. Note that the configuration of the proposer 18 is not limited to using the remaining amount of the power source to determine whether Condition 5 is satisfied. For example, in the case where the remaining amount of the power source is less than or equal to a predetermined value, the proposer 18 may determine that Condition 5 is satisfied.

In order to determine whether Condition 6 is satisfied, the proposer 18 acquires temperature data from a temperature sensor which is not shown. The temperature data indicates the temperature outside the mobile unit 2. The proposer 18 determines, on the basis of the temperature data, whether the temperature outside the mobile unit 2 falls within a predetermined temperature range. When the temperature outside the mobile unit 2 falls within the predetermined temperature range, the proposer 18 determines that Condition 6 is satisfied. This determination based on Condition 6 by the proposer 18 allows efficient battery charging. Note that the temperature data may further indicate battery temperature. In this case, when the battery temperature and the temperature outside the mobile unit 2 are both within the predetermined temperature range, the proposer 18 determines that Condition 6 is satisfied. This allows battery charging at temperatures suitable for charging and suppresses battery deterioration and an increase in charging time.

The proposer 18 may also be configured to perform the recharging proposal processing when Conditions 7, 8, 9, and 10 described below are further satisfied in addition to the six conditions described above.

Condition 7: there is an insufficient cruising distance based on the remaining amount of the power source at the present time.

Condition 8: a total number of recharging facilities located along the route from the first destination to the second destination is less than a predetermined number.

Condition 9: there is a forecast of bad weather in the future in a region around the current location of the mobile unit 2.

Condition 10: there is a recharging facility of a type that the user often uses, around the current location of the mobile unit 2.

In order to determine whether Condition 7 is satisfied, for example, the proposer 18 may determine whether there is an insufficient cruising distance with respect to the distance from the current location of the mobile unit 2 to the second destination. Specifically, the proposer 18 determines whether the cruising distance is shorter than a route distance or whether the cruising distance is longer than the route distance and a difference between the cruising distance and the route distance is less than or equal to a predetermined distance. The cruising distance refers to a distance over which the mobile unit 2 is capable of continuing to travel without recharging the power source.

The cruising distance is calculated based on the remaining amount of the power source. The route distance refers to a distance from the current location of the mobile unit 2 via the first destination to the second destination. The fact that there is enough cruising distance, i.e., the fact that the cruising distance is longer than the route distance and the difference between the cruising distance and the route distance exceeds the predetermined distance, means that the mobile unit 2 is capable of arriving at the second destination with enough remaining amount of the power source. The predetermined distance under Condition 7 is hereinafter also described as the "third predetermined distance."

For example, in the case where the route distance is greater than or equal to 75% of the cruising distance, the proposer 18 may determine that Condition 7 is satisfied. The proposer 18 calculates the cruising distance and the route distance on the basis of the map data, the destination information, the charge remaining data on the power source, and the position data indicating the current location of the mobile unit 2. Note that the cruising distance and the route distance may be calculated by the navigator 17. When the mobile unit 2 has come close to the first destination within the first predetermined distance, the proposer 18 determines whether Condition 7 is satisfied. This determination based on Condition 7 by the proposer 18 inhibits the recharging proposal information 38 from being output with unnecessary timing.

In order to determine whether Condition 8 is satisfied, the proposer 18 acquires the recharging facility information from the map data. In the present embodiment, the proposer 18 acquires the recharging facility information when the mobile unit 2 has come close to the first destination within the first predetermined distance. The proposer 18 obtains the number of recharging facilities located along the route, on the basis of the destination information, the recharging facility information, and the position data indicating the current location of the mobile unit 2.

"Along the route" may refer to, for example, a "range fronting on the set route." For example, "along the route"

may be a range of 50 m or more and 500 m and less from the set route in the width direction of the road. If the information output device 1 has a commonly known retrieval function of retrieving facilities located along the route, the proposer 18 may obtain the number of recharging facilities through operations of the retrieval function.

Even in the case where the information output device 1 has the aforementioned commonly known retrieval function, the proposer 18 may expand the range of retrieval from the range used by the retrieval function so as to obtain the number of recharging facilities located along the route. In the case where the information output device 1 does not have the aforementioned commonly known retrieval function, the proposer 18 may use a range centering on the current location of the mobile unit 2 as the range along the route to obtain the number of recharging facilities. For example, this range may be a range within a radius of 500 m from the current location of the mobile unit 2. The predetermined number may, for example, be one or more and 50 or less.

In order to determine whether Condition 9 is satisfied, for example, the proposer 18 may determine whether there is a forecast of inclement weather around the current location of the mobile unit 2 or along the route ahead of the current location of the mobile unit 2 within a predetermined period of time. For example, the predetermined time may be a duration of time that has elapsed from the present time and that ranges from one hour to 24 hours. The inclement weather refers to a condition of bad weather such as rainfall, heavy rain, snowfall, heavy snow, wind gust, or typhoon, and does not include a clear sky and clouding.

When the mobile unit 2 has come close to the first destination within the first predetermined distance, the proposer 18 acquires the weather information from the weather server 4 via the second communication controller 16. The proposer 18 determines, on the basis of the weather information, whether there is a forecast of bad weather in the future for a region around the current location of the mobile unit 2.

In order to determine whether Condition 10 is satisfied, the proposer 18 acquires, from the map data, the recharging facility information on one or two or more recharging facilities located around the current location of the mobile unit 2. In the case where electricity serves as the power source, the proposer 18 determines, on the basis of the recharging facility information, whether there is a charging facility of a type that the user often uses, around the current location of the mobile unit 2. The information indicating the types of previously used charging facilities may be accumulated in, for example, the aforementioned non-volatile storage device. The proposer 18 determines, on the basis of the accumulated information, the frequency of use of each type of charging facilities by the user.

If there is a variation among the frequencies of use, the proposer 18 may target all types of charging facilities. For example, the type of each charging facility may be determined based on a maximum output of a charger and an installation facility in which the charger is installed. Examples of the installation facility include a convenience store, a public service, a dealer, a service area, and a parking area. In the case where the user often uses the recharging-facility retrieval function and has already set less specific conditions for retrieving charging facilities, it is desirable to perform operations in accordance with these conditions. For example, information on those conditions may be stored in the aforementioned non-volatile storage device. The proposer 18 determines whether Condition 10 is satisfied, when the mobile unit 2 has come close to the first destination within the first predetermined distance.

As described above, the proposer 18 may be configured to perform the recharging proposal processing when each of the following combinations of conditions is satisfied.
Conditions 1, 2, and 3
Conditions 1, 2, and 4
Conditions 1, 2, 3, 5, 6, and 7
Conditions 1, 2, 4, 5, 6, and 7
Conditions 1, 2, 3, 5, 6, and 8
Conditions 1, 2, 4, 5, 6, and 8
Conditions 1, 2, 3, 5, 6, and 9
Conditions 1, 2, 4, 5, 6, and 9
Conditions 1, 2, 3, 5, 6, and 10
Conditions 1, 2, 4, 5, 6, and 10

Alternatively, the proposer 18 may be configured to perform the recharging proposal processing in cases other than the above cases or only in the case where Conditions 1 to 10 are all satisfied.

The output controller 19 outputs the recharging proposal information 38 to the output device 12. The output controller 19 outputs the recharging proposal information 38 to the output device 12 when the proposer 18 has determined that the predetermined conditions are satisfied. In the present embodiment, a screen 34 relating to the recharging proposal information 38 includes a map area 32 and a proposal information area 33 as shown in FIG. 2. The map area 32 displays the map 31.

The map 31 shows the current location of the mobile unit 2 by the current location mark 35. The map 31 shows the first and second destinations as the goal icons 36. The map 31 shows POIs as various icons. Specifically, the map 31 shows the locations of each recharging facility by a recharging facility mark 39. The map 31 shows the route set by the navigator 17 by the route graphic 37. The route graphic 37 is a long slender graphic arranged along the road shown on the map 31. The route graphic 37 is shown in a different color from the other roads shown on the map 31.

In the present embodiment, the recharging proposal information 38 incudes text data that proposes the recharging of the power source. The recharging proposal information 38 may further include text data that indicates the reason why recharging is recommended. The recharging proposal information 38 may further include text data that indicates the distance along the route from the current location of the mobile unit 2 to the first destination.

The recharging proposal information 38 may include text data for allowing the user to confirm whether or not to display desirable recharging facilities on the output device 12. In the case where the recharging proposal information 38 includes such text data utilized for confirmation, the screen 34 includes buttons 40 that are used by the user to respond to the recharging proposal information 38. For example, each button 40 may indicate a character saying "Yes" or "No".

In the present embodiment, for example, the recharging proposal information 38 may indicate the following content.

"Approximately OO km ahead is the destination. Because ####, battery charging before arrival is recommended in order to make the next transition smooth. Would you like to see display of desirable recharging facilities?"

In the above exemplification, the "destination" corresponds to the first destination. Also, "OO km" indicates the distance from the current location of the mobile unit 2 to the first destination along the route, and "####" indicates the reason why it is recommended to charge the battery before arrival at the first destination. Examples of the reason include that there is a forecast of bad weather, there is a long distance to the next destination, and here is only a small number of recharging facilities located around the route to the next destination.

Alternatively, the output controller 19 may be configured to output voice data, instead of text data, to confirm whether to retrieve desirable recharging facilities. As another alternative, the output controller 19 may be configured to output both text data and voice data to make this confirmation.

In the case where the user wants to retrieve desirable recharging facilities, for example, the output controller 19 may display a list of recharging facilities, which is not shown, on the output device 12. The recharging facility list is a list showing information on one or two or more recharging facilities located around the current location of the mobile unit 2. This information may, for example, be information that indicates, for example, the name and place of each recharging facility, the type of a charger, and business hours.

The recharging facilities shown in the list of recharging facilities are those that are grasped by the proposer 18 at the time of determining whether Condition 10 is satisfied. In the case where the user has selected a recharging facility from the list of recharging facilities, the output controller 19 displays, on the output device 12, the map 31 that shows the route via the selected recharging facility to the first destination as shown in FIG. 4. In the case where the user does not want to retrieve any recharging facility, the output controller 19 continues to guide the mobile unit to the first destination without changing the set route. The output controller 19 also continues to guide the mobile unit to the first destination when no operations have been made to the input device 11 for a fixed period of time.

The information output device 1 as described above is configured as a computer. In the present embodiment, the first communication controller 15, the second communication controller 16, the navigator 17, the proposer 18, and the output controller 19 may be realized by, for example, a hardware processor such as a CPU executing software programs stored in the storage device 13.

Some or all of the constituent elements of the information output device 1 may also be realized by hardware such as a large scale integration (LSI) circuit, an application specific integrated circuit (ASIC), a field-programmable gate array (FPGA), or a graphics processing unit (GPU), or may be realized by cooperation of software and hardware.

The software programs may be stored in advance in the storage device 13 such as an HDD or flash memory, or may be stored in a detachable storage medium such as a DVD or a CD-ROM. The software programs may also be installed in the information output device 1 by mounting a storage medium as described above on the information output device 1.

Recharging Proposal Processing

The proposer 18 performs the recharging proposal processing by operations shown in the flowchart in FIG. 5. The recharging proposal processing starts when the first destination is set.

In step S1, the proposer 18 determines whether the mobile unit 2 has come close to the first destination within the first predetermined distance while the navigator 17 is guiding the mobile unit 2 along the route. When the mobile unit 2 has come close to the first destination within the first predetermined distance during route guidance (Yes in S1), the proposer 18 advances the recharging proposal processing to step S2. When the mobile unit 2 is not being guided along the route or the mobile unit 2 has not yet come close to the first destination within the first predetermined distance (No in S1), the proposer 18 advances the processing to step S5.

In step S2, the proposer 18 determines whether the first destination is either one of a recharging facility and the user's home. When the first destination is either one of a recharging facility and the user's home (Yes in S2), the proposer 18 advances the processing to step S5. When the first destination is neither of a recharging facility nor the user's home (No in S2), the proposer 18 advances the processing to step S3.

In step S3, the proposer 18 determines whether the second destination has been set. When the second destination has been set (Yes in S3), the proposer 18 advances the processing to step S5. When the second destination is not set (No in S3), the proposer 18 advances the processing to step S4.

In step S4, the proposer 18 determines whether the distance from either the user's home or the start location of the mobile unit 2 to the first destination is greater than or equal to the second predetermined distance. When the distance is greater than or equal to the second predetermined distance (Yes in S4), the proposer 18 advances the processing to step S5. When the distance is less than the second predetermined distance (No in S4), the proposer 18 ends the recharging proposal processing without outputting the recharging proposal information.

In step S5, the proposer 18 determines whether the remaining amount of the power source is less than or equal to a predetermined ratio. When the remaining amount of the power source is less than or equal to the predetermined ratio (Yes in S5), the proposer 18 advances the processing to step S9. When the remaining amount of the power source exceeds the predetermined ratio (No in S5), the proposer 18 advances the processing to step S6.

In step S6, the proposer 18 determines whether the cruising distance based on the remaining amount of the power source is insufficient with respect to the distance from the current location of the mobile unit 2 to the second destination. When there is an insufficient cruising distance (Yes in S6), the proposer 18 advances the processing to step S9. When there is a sufficient cruising distance (No in S6), the proposer 18 advances the processing to step S7.

In step S7, the proposer 18 determines whether the number of recharging facilities located along the route to either the second destination or the start location is less than a predetermined number. When the number of recharging facilities is less than the predetermined number (Yes in S7), the proposer 18 advances the processing to step S9. When the number of recharging facilities is greater than or equal to the predetermined number (No in S7), the proposer 18 advances the processing to step S8.

In step S8, the proposer 18 determines whether there is a forecast of inclement weather around the current location of the mobile unit 2 or along the route from the current location to the second destination within a predetermined period of time from the present time. When there is a forecast of inclement weather (Yes in S8), the proposer 18 advances the processing to step S9. When there is no forecast of inclement weather (No in S8), the proposer 18 ends the recharging proposal processing without outputting the recharging proposal information.

In step S9, the output controller 19 outputs the recharging proposal information 38 to the output device 12 and advances the processing to step S10.

In step S10, the proposer 18 determines whether the user has issued an instruction to retrieve recharging facilities. When there is the instruction (Yes in S10), the navigator 17 performs the recharging-facility retrieval processing in step S11 and ends the recharging proposal processing. When there is no instruction to retrieve recharging facilities (No in S10), the navigator 17 ends the recharging proposal processing without outputting the recharging proposal information. Note that the operations shown in the flowchart described above are merely one example. For example, the recharging proposal processing may further include an operation that is performed based on at least either one of Conditions 6 and 10 described above.

As described thus far, the information output device 1 according to the present embodiment includes the output device 12 and the control device 14. The output device 12 outputs at least one of image data, text data, or voice data. The control device 14 causes the output device 12 to output the recharging proposal information 38 when the predetermined conditions are satisfied. The recharging proposal information 38 is information that encourages the recharging of the power source.

The power source drives the mobile unit 2. The predetermined conditions include Conditions 1 and 2. Condition 1 is that the first and second destinations are set as the destinations of the mobile unit 2. The second destination is a destination for which the mobile unit 2 heads after arrival at the first destination. Condition 2 is that the mobile unit 2 has come close to the first destination within the first predetermined distance.

In the present embodiment, the predetermined conditions further include Condition 3. Condition 3 is that the first destination is not a recharging facility. The recharging facility is a facility in which the mobile unit 2 is capable of recharging the power source. The control device 14 acquires the destination information. The destination information indicates the set destinations. The control device 14 is configured not to output the recharging proposal information 38 when the first destination is a recharging facility.

In the present embodiment, the predetermined conditions further include Condition 7. Condition 7 is that the cruising distance is shorter than the route distance or that the difference between the cruising distance and the route distance is shorter than or equal to a predetermined distance. The cruising distance is the distance over which the mobile unit 2 is assumed to be capable of continuing to travel with the remaining amount of the power source. The route distance is the distance from the current location of the mobile unit 2 to the second destination. When the mobile unit 2 has come close to the first destination within the predetermined distance, the control device 14 acquires charge remaining data to calculate the cruising distance.

When the mobile unit 2 has come close to the first destination within the predetermined distance, the control device 14 also acquires position data to calculate the route distance. The charge remaining data indicates the remaining amount of the power source. The position data indicates the location of the mobile unit 2. The control device 14 is configured not to output the recharging proposal information 38 when the cruising distance is longer than the route distance and the difference between the cruising distance and the route distance exceeds the predetermined distance.

In the present embodiment, the predetermined conditions further include Condition 8. Condition 8 is that the number of recharging facilities located along the route from the first destination to the second destination is less than a predetermined number. When the mobile unit 2 has come close to the first destination within the first predetermined distance, the control device 14 acquires the recharging facility information. The recharging facility information is information on the recharging facilities located along the route from the first destination to the second destination. When the number of recharging facilities is greater than or equal to the predetermined number, the control device 14 does not perform the recharging proposal processing.

In the present embodiment, the predetermined conditions further include Condition 9. Condition 9 is that there is a forecast of inclement weather around the current location of the mobile unit 2 or along the route ahead of the current location. When the mobile unit 2 has come close to the first destination within the first predetermined distance, the control device 14 acquires the weather information. The control device 14 is configured not to output the recharging proposal information 38 when there is no forecast of inclement weather around the current location of the mobile unit 2 or along the route ahead of the current location within a predetermined period of time.

Meanwhile, as a comparative example, there is an electric vehicle (EV)-specific navigation system equipped with a function of, in the case of setting destinations, proposing charging responsive to the cruising distance or automatically setting a stopping-off charging facility. However, this system fails into disuse because the following problems cannot be solved.

When the user wants to leave early for the next destination, it is annoying that the battery needs to be charged due to its not enough remaining charge.

The user may be directed to a recharging facility that the user does not want to go to.

Even if following the guidance of the navigation system, the user feels anxious whether the user will be able to reach any recharging facility.

It's hot, so it would be a problem if it takes a long time to charge the battery on the way.

It's cold in the mornings in winter, so the user wants to charge the battery efficiently while the mobile unit is warmed up from driving.

As another comparative example, there is a navigation system equipped with a function of, for the purpose of next eco-driving, providing voice guidance for encouraging charging when the user has arrived at home. However, this navigation system has the following problems.

It would be a trouble if charging instructions are given only when the user has arrived at home.

The purpose is not eco-driving but energy charging; i.e., the mobile unit is incapable of running without charging.

In contrast, the information output device 1 according to the present embodiment is capable of proposing a recharging facility located around an intermediate destination to which the mobile unit is currently being guided, i.e., the first destination serving as a point on the way, immediately before arriving at the first destination. That is, the information output device 1 is capable of proposing a site where the power source can be recharged, in advance before staring to guide the mobile unit from the first destination to the second destination.

Besides, the information output device 1 is capable of determining whether to propose a recharging facility, on the basis of not only the remaining amount of the power source but also at least one of factors such as weather, outside temperature, the type of the destination, and conditions of the power source unit 22 including temperature. Then, only when making a recommendation for recharging before arrival, the information output device 1 is capable of providing guidance that recommends the recharging of the power source and providing a list of recharging facilities. That is, the information output device 1 is capable of recommending the execution of the recharging proposal processing only when it is desirable to charge the power source at present and inhibiting the execution of the recharging proposal processing when it is undesirable to charge the power current at present or when it is desirable to recharge the power source on the way to the destination."

For example, the information output device 1 is usable in such a situation that the route of a trip is planned in advance to go to a hot spring hotel on the first day and then head for sightseeing spots on the next day and at this time the remaining amount of the power source is enough to reach the hot spring hotel, but may not be enough to go to the sightseeing spots on the next day. When having come close to the hot-spring hotel, the information output device 1 is in either of the following situations. In particular, if there is a desirable recharging facility suitable for weather or battery status including temperature, the information output device 1 outputs a facility list and provides voice guidance for encouraging recharging to the output device 12 so as to prompt the user to recharge the power source.

- The user is able to use a recharging facility in the hotel.
- There is a nearby recharging facility capable of quick charging.

For example, in the case where the power source cannot be recharged at the first destination or where there are no nearby recharging facilities, the information output device 1 according to the present embodiment does not take the trouble to encourage recharging in places around the first destination and accordingly allows a smooth transition of the mobile unit 2 to the next activity. This improves customer convenience in, for example, cases such as where the user wants to charge the battery near the accommodation on the first day of the trip and go for sightseeing early in the next morning.

The information output device 1 as described above is capable of achieving its object and solving the problems described below.

- Conventional technology fails to meet the user's demand that after arriving at a stopover point, the user wants to depart smoothly and arrive early at the next destination.
- A transition to the next activity is made smooth in, for example, cases such as where the user wants to charge the battery on the day of the trip near the accommodation and go sightseeing early in the next morning. This is effective not only in pleasure situations but also in business trip situations.
- If there is a recharging facility at a stopover point, the user would like to use that recharging facility if it is available.
- Depending on the situation, a proposal is made to efficiently recharge the power source. The proposal to recharge the power source is not offered depending on factors such as weather, temperature, and the state of the mobile unit 2. Accordingly, the information output device 1 allows efficient charging even for relatively low-priced electric automobiles that do not actively perform battery temperature control.
- Depending on a weather forecast for the next day, a proposal is offered that if there is a forecast of rainfall on the next day, the user charges the battery at present in order to eliminate the need to charge the battery in the rain.

While the embodiment of the present invention has been described thus far, the configuration of the device, the control method, and any other features are not only limited to the above-described embodiment.

For example, the output device 12 according to the present embodiment outputs the recharging proposal information 38 in the form of text data, but the present invention is not limited to this configuration. The information output device 1 may be configured to output the recharging proposal information 38 by voice.

The information output device 1 according to the present embodiment includes the input device 11, the output device 12, the storage device 13, and the control device 14, but the present invention is not limited to this configuration. For example, the information output device 1 may be configured not to include at least either one of the input device 11 and the storage device 13. In this case, for example, the information output device 1 may be configured to acquire the recharging proposal information 38 from a server, which is not shown, and to output the acquired information to the output device 12. The control device 14 may be configured not to include at least any one of the first communication controller 15, the second communication controller 16, the navigator 17, and the proposer 18.

The other configuration may also be modified in various ways within a range that does not deviate from the gist of the present invention. For example, the present invention may also include a combination of some or all of the configurations according to the embodiment and the variations described above. For example, the present invention may be implemented as a program for causing a computer to function as an output device and a control device, the output device outputting at least one of image data, text data, or voice data, the control device causing the output device to output proposal information when predetermined conditions are satisfied, the proposal information being information for encouraging recharging of the power source that drives the mobile unit. The conditions include a condition that the first and second destinations are set as the destinations of the mobile unit and a condition that the mobile unit has come close to the first designation within the predetermined distance, the second destination being a destination for which the mobile unit heads after arrival at the first destination. The present invention may also be implemented as a recording medium that records the aforementioned program thereon.

REFERENCE SIGNS LIST

1 information output device
2 mobile unit
12 output device
14 control device
38 recharging proposal information

The invention claimed is:

1. An information output device comprising:
an output device that outputs at least one of image data, text data, or voice data; and
a control device that causes the output device to output recharging proposal information, the recharging proposal information being information that encourages recharging of a power source that drives a mobile unit,
wherein:
when a first destination and a second destination are set as destinations of the mobile unit, the second destination being a destination for which the mobile unit heads after arrival at the first destination; and
when a cruising distance is shorter than a route distance, the cruising distance being a distance over which the mobile unit is assumed to be capable of continuing to travel with a remaining amount of the power source, the route distance being a distance from a current location of the mobile unit to the second destination,
wherein the control device calculates a difference between the cruising distance and the route distance, and wherein:
based on the calculation, the control device outputs the recharging proposal information when the difference is less than or equal to a predetermined value;
while the control device does not output the recharging proposal information regardless of existence of a recharging facility between a current location of the mobile unit and the second destination, when the first destination is the recharging facility or the difference is more than the predetermined value, the recharging facility being a facility where the mobile unit is capable of recharging the power source.

2. The information output device according to claim 1, wherein the control device that causes the output device to the output recharging proposal information when a predetermined condition is satisfied, the predetermined condition being that a total number of recharging facilities is less than a predetermined number, the recharging facilities each being the recharging facility and located along a route from the first destination to the second destination, and wherein:
when the mobile unit has come close to a position located within the first predetermined distance from the first destination, the control device acquires recharging facility information on the recharging facilities located along the route from the first destination to the second destination, and the total number of the recharging facilities is greater than the predetermined number;
the control device does not output the recharging proposal information.

3. The information output device according to claim 2, wherein the predetermined condition further includes a condition that there is a forecast of inclement weather at the current location of the mobile unit or along the route ahead of the current location, and wherein:
when the mobile unit has come close to a position located within the first predetermined distance from the first destination, the control device acquires weather information, and when there is no forecast of inclement weather at the current location of the mobile unit or along the route ahead of the current location within a predetermined period of time from a present time;
the control device does not output the recharging proposal information.

4. An information output control method for use in a control device that causes an output device to output recharging proposal information, the output device outputting at least one of image data, text data, or voice data, the recharging proposal information being information that encourages recharging of a power source that drives a mobile unit,
the information output control method comprising:
accepting setting of a first destination and a second destination serving as destinations of the mobile unit, the second destination being a destination for which the mobile unit heads after arrival at the first destination;
determining whether a cruising distance is shorter than a route distance, the cruising distance being a distance over which the mobile unit is assumed to be capable of continuing to travel with a remaining amount of the power source, the route distance being a distance from a current location of the mobile unit to the second destination;
calculating a difference between the cruising distance and the route distance when the cruising distance is shorter than the route distance; and
outputting the recharging proposal information when the difference is less than or equal to a predetermined value, while the control device does not output the recharging proposal information regardless of existence of a recharging facility between a current location of the mobile unit and the second destination when the first destination is the recharging facility or the difference is more than the predetermined value, the recharging facility being a facility where the mobile unit is capable of recharging the power source.

* * * * *